United States Patent
Saliba et al.

(10) Patent No.: US 7,085,095 B2
(45) Date of Patent: Aug. 1, 2006

(54) ELECTROMAGNETIC VOID-SENSING PROBES AND POSITION CONTROL SYSTEMS

(75) Inventors: George A. Saliba, Northborough, MA (US); Leo Cappabianca, Worcester, MA (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 10/928,003

(22) Filed: Aug. 27, 2004

(65) Prior Publication Data

US 2005/0088770 A1 Apr. 28, 2005

Related U.S. Application Data

(60) Provisional application No. 60/512,998, filed on Oct. 20, 2003.

(51) Int. Cl.
  *G11B 5/584* (2006.01)
  *G11B 21/02* (2006.01)
  *G11B 17/00* (2006.01)

(52) U.S. Cl. .................. 360/77.12; 360/71; 360/75

(58) Field of Classification Search ............... None
  See application file for complete search history.

(56) References Cited

U.S. PATENT DOCUMENTS

| | | | |
|---|---|---|---|
| 2,937,239 A | 5/1960 | Walker et al. |
| 3,633,038 A | 1/1972 | Falk |
| 3,829,895 A | 8/1974 | Tanaka et al. |
| 3,919,697 A | 11/1975 | Walker |
| 3,971,002 A | 7/1976 | Bricot et al. |
| 4,056,830 A | 11/1977 | Smith |
| 4,110,799 A | 8/1978 | Bergmans et al. |
| 4,149,204 A | 4/1979 | Marino et al. |
| 4,176,381 A | 11/1979 | de Niet et al. |
| 4,321,634 A | 3/1982 | Lehureau |
| 4,334,252 A | 6/1982 | Toriu |
| 4,392,163 A | 7/1983 | Rijckaert et al. |
| 4,422,112 A | 12/1983 | Tanaka |
| 4,424,541 A | 1/1984 | Koinuma et al. |
| 4,439,793 A | 3/1984 | Nater |
| 4,449,082 A | 5/1984 | Webster |
| 4,472,750 A | 9/1984 | Klumpp et al. |
| 4,479,156 A | 10/1984 | Kumagai et al. |
| 4,502,082 A | 2/1985 | Ragle et al. |
| 4,539,615 A | 9/1985 | Arai et al. |
| 4,679,104 A | 7/1987 | Dahlerud |
| 4,685,005 A | 8/1987 | Fields, Jr. |
| 4,802,030 A | 1/1989 | Henry et al. |
| 4,816,939 A | 3/1989 | Ford et al. |

(Continued)

FOREIGN PATENT DOCUMENTS

EP 0 854 471 A1 7/1998

(Continued)

*Primary Examiner*—Andrew L. Sniezek
(74) *Attorney, Agent, or Firm*—Morrison & Foerster LLP

(57) ABSTRACT

In one aspect, an electromagnetic or capacitive sensing position system for determining the relative position of at least one void in a conductive material is provided. In one example, the system includes a sensor (or probe) having at least two probe elements (e.g., tips or plates). The position of the probe relative to the at least one void is determined in response to an electrical signal (e.g., a differential signal) measured across the two probe elements that varies in response to interaction of the probe elements with the at least one void. The system may be used, e.g., to servo a magnetic head assembly relative to a magnetic storage tape.

46 Claims, 8 Drawing Sheets

U.S. PATENT DOCUMENTS

| | | | |
|---|---|---|---|
| 4,866,548 | A | 9/1989 | Rudi |
| 4,975,791 | A | 12/1990 | Eggebeen |
| 4,979,051 | A | 12/1990 | Eggebeen |
| 5,050,017 | A | 9/1991 | Carr et al. |
| 5,055,959 | A | 10/1991 | Saliba |
| 5,121,270 | A | 6/1992 | Alcudia et al. |
| 5,126,895 | A | 6/1992 | Yasuda et al. |
| 5,132,861 | A | 7/1992 | Behr et al. |
| 5,257,148 | A | 10/1993 | Solhjell et al. |
| 5,262,908 | A | 11/1993 | Iwamatsu et al. |
| 5,285,331 | A | 2/1994 | White |
| 5,289,328 | A | 2/1994 | Saliba |
| 5,294,791 | A | 3/1994 | Pahr |
| 5,294,803 | A | 3/1994 | Pahr |
| 5,371,638 | A | 12/1994 | Saliba |
| 5,426,551 | A | 6/1995 | Saliba |
| 5,448,430 | A | 9/1995 | Bailey et al. |
| 5,452,152 | A | 9/1995 | Rudi |
| 5,488,519 | A * | 1/1996 | Ishida et al. ............. 360/77.03 |
| 5,523,904 | A | 6/1996 | Saliba |
| 5,563,868 | A | 10/1996 | Farnsworth et al. |
| 5,588,007 | A | 12/1996 | Ma |
| 5,600,500 | A | 2/1997 | Madsen et al. |
| 5,757,575 | A | 5/1998 | Hallamasek et al. |
| 5,796,537 | A | 8/1998 | Goker et al. |
| 5,815,337 | A | 9/1998 | Milo |
| 5,844,814 | A | 12/1998 | Chliwnyj et al. |
| 5,847,892 | A | 12/1998 | Goker |
| 5,862,014 | A | 1/1999 | Nute |
| 5,940,238 | A | 8/1999 | Nayak et al. |
| 5,949,604 | A | 9/1999 | Saliba |
| 5,973,872 | A | 10/1999 | Saliba |
| 5,973,874 | A | 10/1999 | Panish et al. |
| 5,978,188 | A | 11/1999 | Kaaden et al. |
| 6,005,737 | A | 12/1999 | Connolly et al. |
| 6,018,434 | A | 1/2000 | Saliba |
| 6,061,199 | A | 5/2000 | Goker et al. |
| 6,075,678 | A | 6/2000 | Saliba |
| 6,084,740 | A | 7/2000 | Leonhardt et al. |
| 6,088,184 | A | 7/2000 | Hu |
| 6,108,159 | A | 8/2000 | Nute et al. |
| 6,118,605 | A | 9/2000 | Call et al. |
| 6,128,155 | A | 10/2000 | Sugawara et al. |
| 6,130,792 | A | 10/2000 | Goker |
| 6,134,072 | A | 10/2000 | Zweighaft |
| 6,141,174 | A | 10/2000 | Judge et al. |
| 6,188,532 | B1 | 2/2001 | Albrecht et al. |
| 6,222,698 | B1 | 4/2001 | Barndt et al. |
| 6,236,529 | B1 | 5/2001 | Leonhardt et al. |
| 6,246,535 | B1 | 6/2001 | Saliba et al. |
| 6,275,349 | B1 | 8/2001 | Smith |
| 6,275,350 | B1 | 8/2001 | Barndt |
| 6,285,519 | B1 | 9/2001 | Goker |
| 6,307,718 | B1 | 10/2001 | Kasetty |
| 6,331,920 | B1 | 12/2001 | Albrecht et al. |
| 6,339,522 | B1 | 1/2002 | Hoelsaeter |
| 6,366,422 | B1 | 4/2002 | Daniel et al. |
| 6,433,951 | B1 | 8/2002 | Lubratt |
| 6,493,174 | B1 | 12/2002 | Stubbs |
| 6,512,651 | B1 | 1/2003 | Eifert et al. |
| 6,545,837 | B1 | 4/2003 | Tran |
| 6,570,731 | B1 | 5/2003 | Burke et al. |
| 6,700,729 | B1 | 3/2004 | Beck et al. |
| 6,768,606 | B1 | 7/2004 | Saliba et al. |
| 6,775,092 | B1 | 8/2004 | Zweighaft et al. |
| 6,801,383 | B1 | 10/2004 | Zweighaft et al. |
| 6,839,196 | B1 | 1/2005 | Trivedi |
| 2002/0021524 | A1 | 2/2002 | Saliba et al. |
| 2002/0176200 | A1 | 11/2002 | Trivedi |
| 2003/0043498 | A1 | 3/2003 | Johnson et al. |
| 2004/0042115 | A1 | 3/2004 | Saliba et al. |
| 2005/0083600 | A1 | 4/2005 | Mahnad et al. |
| 2005/0083601 | A1 | 4/2005 | Mahnad et al. |
| 2005/0083602 | A1 | 4/2005 | Saliba et al. |
| 2005/0088776 | A1 | 4/2005 | Saliba et al. |
| 2005/0094308 | A1 | 5/2005 | Mahnad et al. |

FOREIGN PATENT DOCUMENTS

| | | |
|---|---|---|
| EP | 0 854 471 B1 | 7/1998 |
| EP | 0 919 990 A2 | 6/1999 |
| EP | 0 919 990 A3 | 6/1999 |
| EP | 0 996 127 A2 | 4/2000 |
| EP | 0 996 127 A3 | 4/2000 |
| EP | 0 996 127 B1 | 4/2000 |
| JP | 59-185020 A | 10/1984 |

* cited by examiner

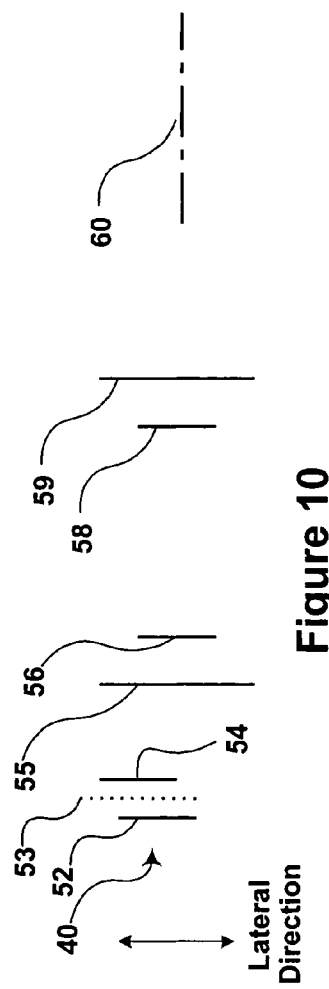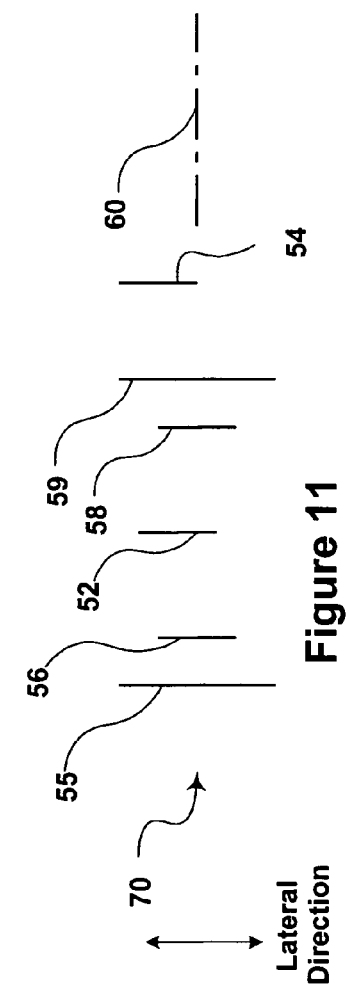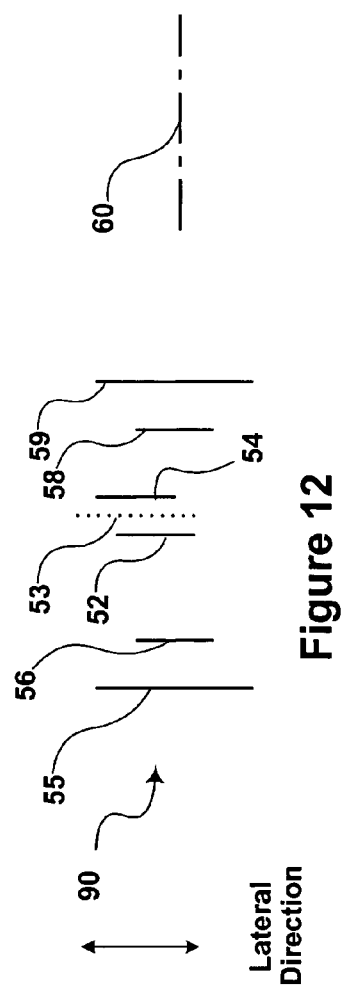

ELECTROMAGNETIC VOID-SENSING PROBES AND POSITION CONTROL SYSTEMS

CROSS REFERENCE TO RELATED APPLICATION

The present application claims benefit of earlier filed provisional patent application, U.S. Application No. 60/512,998, filed on Oct. 20, 2003, and entitled "ELECTROMAGNETIC VOID-SENSING PROBES AND POSITION CONTROL SYSTEMS," which is hereby incorporated by reference as if fully set forth herein.

BACKGROUND

1. Field of the Invention

The invention relates generally to position sensing methods and control systems (e.g., servo control systems), and more particularly to methods and systems for sensing the position of a conductive material with electromagnetic or capacitive sensors.

2. Description of the Related Art

Positioning sensors and servo systems are employed in many contexts requiring accurate positioning of device components. For instance, head positioning servo systems may be employed in media drives for accurately positioning a read and/or write head over a selected data track of a storage medium. Many storage systems and media, e.g., optical or magnetic, may employ various positioning sensors and servo systems to increase data recording and retrieval processes. For illustrative purposes only, magnetic tape storage systems and media are described herein.

Magnetic tape-recording remains a viable solution for storage of large amounts of data. Conventionally, at least two approaches are employed for recording digital information onto magnetic recording tape. One approach calls for moving a magnetic tape past a rotating head structure that reads and writes user information from discontinuous transverse tracks. Interactive servo systems are typically employed to synchronize rotation of the head structure with travel of the tape. Another approach is to draw the tape across a non-rotating head at a considerable linear velocity. This approach is sometimes referred to as linear "streaming" tape recording and playback.

In the case of linear tape recording a popular trend is toward multi head, multi-channel fixed head structures with smaller recording gaps and narrower data track widths so that many linear data tracks may be achieved on a tape medium of a predetermined width, such as one-half inch width tape. To increase the storage density for a given cartridge size the bits on the tape may be written to smaller areas and on a plurality of parallel longitudinal tracks. As more tracks are recorded on a tape, each track becomes increasingly narrow. The tape therefore becomes more susceptible to errors caused from the tape shifting up or down (called lateral tape motion or "LTM") in a direction perpendicular to the tape travel path as the tape passes by the magnetic head. In order to maintain proper alignment of the head with the data tracks on the tape, the tape is generally mechanically constrained to minimize LTM and data retrieval errors.

Lateral tape motion is generally defined as the undesirable movement (in-plane) of the tape perpendicular to its prescribed longitudinal direction of motion past a read/write head. Lateral tape motion and the ability to compensate for lateral tape motion is a major limiting factor in determining the minimum width of a track and the minimum spacing between tracks on the tape. Thus, as lateral tape motion is reduced, more tracks may be stored on the tape and the tape data storage capacity increases accordingly.

Tape substrates are also being made thinner to increase the cartridge volumetric data density. Thinner tape substrates allow a longer tape to be contained within the same size diameter reel packages, thereby increasing the data storage of the cartridge. Thinner tapes, however, are generally less rigid making them more susceptible to lateral tape motion.

One approach to minimize lateral tape motion tracking errors is to provide a multi-roller tape guide structure, such as the type described in commonly assigned U.S. Pat. No. 5,414,585, entitled "Rotating Tape Edge Guide," the disclosure thereof being incorporated herein by reference in its entirety. Such an approach has provided a viable "open loop" solution to lateral tape motion, i.e., control of lateral tape motion without the use of feedback. With the advent of new head technologies, such as magneto-resistive read heads, and new higher coercivity recording media, data track widths have become very small, and many additional data tracks may be defined on the tape. Unfortunately, lateral tape motion remains as a limiting factor, and at certain data track width dimensions and data track densities, it is mechanically prohibitive to reduce LTM to follow the tape accurately enough to provide reliable performance during reading and writing operations.

Several "closed loop" methods have been developed to minimize LTM tracking errors, including the use of magnetically recorded or optically detectable servo tracks positioned on a magnetic tape. The servo tracks allow for increased tracking abilities, effectively reducing LTM through servo track feedback mechanisms and the like. These methods, however, have not been able to keep pace with the increased data capacity desired for magnetic tape storage media.

Accordingly, new methods and systems for sensing the relative position of a conductive material are desired. For example, increased tracking sensitivity to detect and correct for LTM and decrease tracking errors allowing for increased data storage capabilities of the storage media is desired.

BRIEF DESCRIPTION OF FIGURES

FIGS. 10–12 illustrate exemplary configurations for probes in a capacitive and/or electric servo system included with a transducer head.

BRIEF SUMMARY

Figure 1:
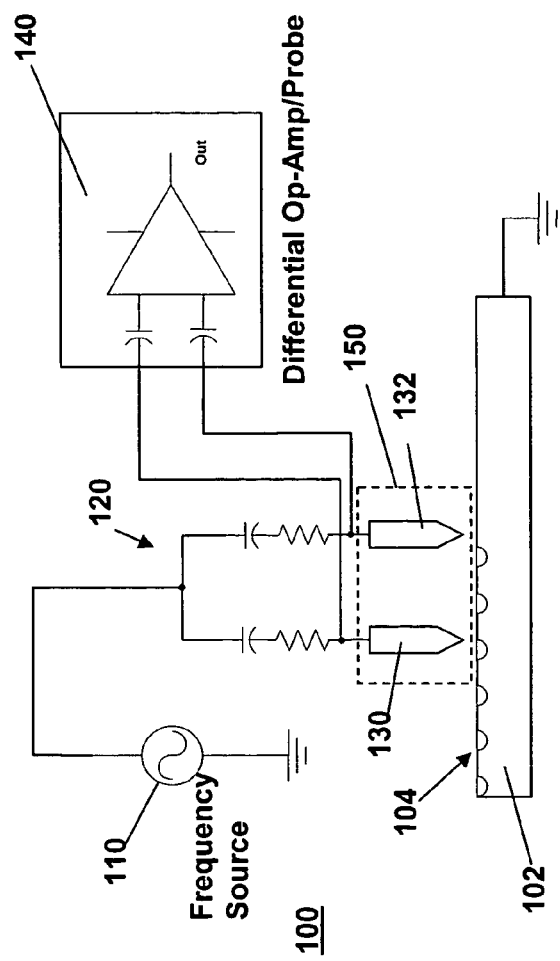
FIG. 1 illustrates an exemplary electromagnetic position sensor system.

In one aspect, an electromagnetic or capacitive sensing position system for determining the relative position of at least one void in a conductive material is provided.

In one example, the system includes a sensor (or probe) having at least two probe elements (e.g., tips or plates). The position of the probe relative to the at least one void is determined in response to an electrical signal (e.g., a differential signal) measured across the two probe elements that varies in response to interaction of the probe elements with the at least one void. In one example, each void may comprise a depression or variance in the shape of a dot, oblong, stripe, or other mark that demonstrates an electrical characteristic different from the surrounding material.

The sensor may comprise at least one pair of probes, wherein a first probe in a pair is displaced 90 degrees apart in a lateral direction (e.g., perpendicular of a linear direction of tape movement) with respect to a second probe in the pair, so as to provide orthogonal probe output signals. The orthogonal output signals contain information regarding position and direction of motion of the at least one probe relative to the at least one void. Alternatively, the probes in a pair may be positioned in a partially orthogonal manner (e.g., at 120 degrees) so as to include at least an orthogonal component.

The at least one void may comprise an array of voids disposed in a known pattern. Further, the at least probe may comprise a grid of probes or a grid of pairs of at least partially orthogonal probes. The relative position of an electric probe grid to the grid of voids is determined in response to an electrical signal (e.g., a differential signal, such as total differential current) measured from a plurality (e.g., all) of the probes in the grid. Alternatively, the relative position of a capacitive probe grid to the grid of voids is determined in response to the variation in the total capacitance measured from a plurality (e.g., all) of the probes in the grid.

Exemplary position sensors may be employed in a media drive, where, for example, the conducting material is associated with a recording medium, each void is a servo mark on a surface of the recording medium, and the position sensor is coupled to a recording head. The media drive may further include a controller for adjusting the lateral position of the head relative to the medium in response to an output of the position sensor. The recording medium may comprise magnetic media such as recording tape, magnetic disk, and the like, or optical media such as an optical disk and the like.

The at least one probe may be mounted on the recording head to detect voids on a front surface of the recording medium. In one example, the first and second probes of a pair of probes may be laterally positioned at least partially orthogonal to each other on an island adjacent a forward write element, which itself may be followed by a forward read element. In general, each probe of the pair may be positioned on a separate island or placed together on any one island ahead, behind, or interspersed among islands carrying the read and write elements. Alternatively, the probes can be placed on one or more outrigger islands away from the recording head. In another example, the probes may be placed on a structure other than the head.

Alternatively, the at least one probe may be used to detect voids on a back, generally nonmagnetic, surface of the recording medium. In one example suitable for tape media drives, the probe is mounted on a support structure that may be moved away from the tape to a distal position to permit a tape buckle to pass during tape loading and unloading. The support structure returns the probe to a proximal position near the tape after the buckle passes.

Various aspects and examples of the present inventions are better understood upon consideration of the detailed description below in conjunction with the accompanying drawings and claims.

DETAILED DESCRIPTION

Various methods and systems for providing calibration and/or position information, e.g., for a servo system, using electromagnetic and/or capacitive probes are provided. The following description is presented to enable any person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. Some exemplary methods and systems are described herein with respect to magnetic storage tape servo systems for illustrative purposes only, and those of ordinary skill in the art will recognize that the methods and systems are applicable to various other positioning systems used, for example, in conjunction with conductive material.

Accurately positioning a transducer head with respect to a magnetic storage tape in a tape drive system during writing and reading processes is one of the main challenges in the area of magnetic storage tape systems. Generally, a closed loop servo system, deployed by the tape drive electromechanical system, utilizes an estimate of the head's position relative to the storage tape to align the transducer head to a data track position. Exemplary methods and systems described below gather positional information for the relative positioning of transducer elements to the magnetic storage tape by utilizing an electric and/or capacitive void-detection servo system.

In one example, a position sensor, e.g., an electric or capacitive sensor, includes at least two probe elements, and the conductive material includes surface depressions or voids. The two probe elements are positioned sufficiently close to the conductive material such that a characteristic of the probe elements varies according to the proximity of the probe elements with a void in the conductive surface. For example, the position of the probe elements relative to one or more voids may be determined by measuring a signal across the two probe elements that is associated with the interaction of the probe elements with the one or more voids on the conductive surface.

In one example, the exemplary servo methods and systems are employed in a magnetic storage drive system, and may obviate the need for optical alignment systems often used in conventional servo positioning systems. The exemplary methods and systems may operate with reduced mechanical apparatus, especially when servoing off the front surface of a recording medium, as described in one example below.

In one exemplary method of an electromagnetic position sensor, two probe elements are positioned adjacent (but not necessarily in contact with) a conductive material. The sensor drives current from the two probe elements (e.g., tips) to the conductive material. The current flow from each probe element is monitored differentially where a loss of current is detected when one of the probe elements passes over a void associated with the conductive material resulting in reduced current flow through that element. Accordingly, the relative position of the probe elements to one or more voids of the conductive material may be derived from signals measured across the probe elements. The signals may relate to various electrical measures across the probe elements (e.g., current, voltage, resistance, and the like). Further, the voids may be patterned on a surface of the conductive material to provide positional information of the conductive material relative to the probe elements.

FIG. 1 illustrates an exemplary electromagnetic position sensor system 100 for determining the relative position of conductive medium 102 with respect to a sensor 150. System 100 includes a frequency source 110, impedance matching circuit 120, sensor 150 including probe elements 130 and 132, and differential op-amp 140. The frequency source 110 provides a driving current to probe elements 130 and 132 and may also be used to increase the signal-to-noise ratio of the system. In one example, frequency source 110 operates at a frequency in a range of 10 MHz to 2 GHz. In other examples, direct current may be used with a suitable electronic system. Impedance matching circuit 120 matches the output impedance of frequency source 110 to the transmission impedance of probe elements 130 and 132. A return electrical path is provided through conductive material 102, which is shown grounded, to prevent a build up of electric charge on conductive material 102.

In operation, probe elements 130 and 132 radiate energy by transmission to conductive material 102. In this example, probe elements 130 and 132 do not touch conductive material 102; however, in other examples and with suitable electrical system, the probes may touch the conductive material directly. Differential op-amp 140 monitors the potential difference between the two probe elements 130 and 132 and outputs a signal associated with the difference and relative position of probe elements 130 and 132 to voids 104. When probe elements 130 and 132 are positioned over conductive material 102, without any voids 104 under the probe elements 130 and 132, the energy transmitted from probe elements 130 and 132 to conductive material 102 is substantially equal (provided the distance from probe elements 130 and 132 to conductive material 102 is equal). Accordingly, the differential op-amp 140 does not measure a difference between probe elements 130 and 132. When a void 104 moves under a probe element, e.g., probe element 130, less energy is conducted from probe element 130 than probe element 132 to conductive material 102, resulting in a decrease of current flow through probe element 130 compared to probe element 132. The smaller current produces a drop in voltage at probe element 130 that is compared by differential op-amp 140 to the voltage from probe element 132 not over void 104. A signal associated with the potential difference of probe elements 130 and 132 is output by differential op-amp 140. A suitable controller/processor (not shown) may receive the signal and perform various signal quality conditioning techniques, filtering, and the like to determine a relative position.

Those of ordinary skill in the art will recognize that various other electromagnetic sensor systems are possible. For example, current through probe elements 130 and 132 could be measured directly, impedance matching circuit 120 may be altered or omitted, and differential op-amp 140 may be altered or omitted. Various other techniques may be used to compare various characteristics in probe elements 130 and 132 as they interact with conductive material 102 and voids 104.

Additionally, various system parameters may be adjusted to provide a desired Signal-to-Noise Ratio (SNR) and support servo operation at high void spatial densities (e.g., associated with high servo track densities). In one example, the operating conditions include a source frequency of approximately 10 KHz to 2 MHz and distance from probe elements 130 and 132 to conductive material 102 of approximately 5 milli-inches for a spatial density of voids 104 in the range of 40μ-inches to 1200μ-inches.

Figure 2:
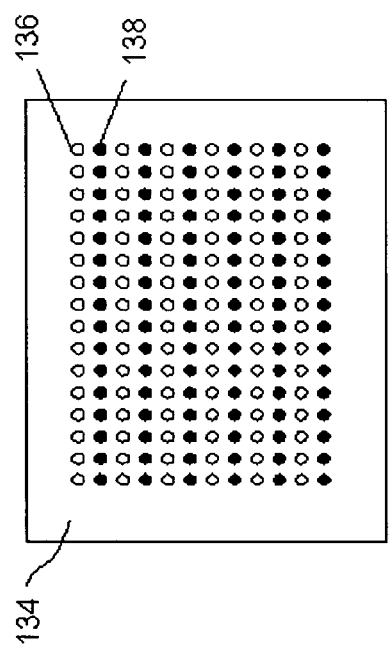
FIG. 2 illustrates an exemplary probe grid array.
Figure 4:
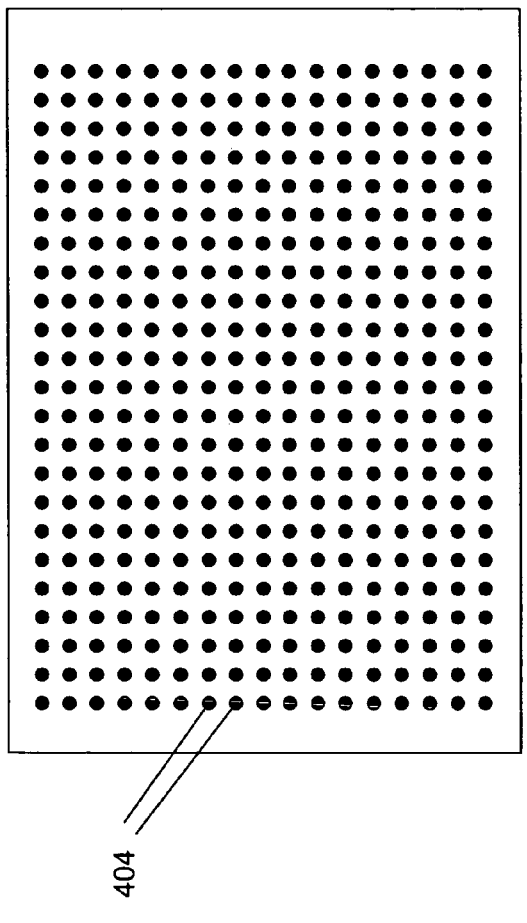
FIG. 4 illustrates an exemplary void pattern on a conductive material.

In another example, the gain may be increased substantially by extending the probe elements into an x-y array of elements. FIG. 2 illustrates a bottom view of position grid sensor 134, including multiple probe elements 136 and 138, where probe elements 136 and 138 correspond to probe elements 130 and 132 of FIG. 1. The signal amplitude may be increased by several orders of magnitude with position grid sensor 134 (generally, the increase is in proportion to the number of probe elements 136, 138 of grid sensor 134). Grid sensor 134 is thus able to measure sensor position relative to a void pattern more finely than a single pair of probe elements (e.g., probe tips 130 and 132). A similar array pattern of voids or servo marks may be patterned on conductive material 102 as illustrated in FIG. 4.

Conductive material 102 may be fabricated using mechanical drilling, chemical etching, laser ablation, surface molding, or other suitable techniques to form voids 104. Voids 104 may include holes, surface depressions, and the like that form areas of less conductivity on the surface of conductive material 102. In other examples, voids 104 may include a pattern of material deposited on the surface of conductive layer 102, where the material is insulating or less conductive than conductive layer 102. One exemplary method for forming voids, e.g., in a magnetic storage tape layer, that may be used in conjunction with the examples herein, is described in U.S. Pat. No. 6,558,774, which is incorporated herein by reference as if fully set forth.

Generally, the dimension of voids 104 and probe elements 130 and 132 determines the positional accuracy and resolution of the position sensor system 100. In the case of magnetic tape media, the void dimensions may be on the order of the data track pitch. For conventional SDLT tape, for example, the void shape may be circular, with a diameter of approximately 12 μm and spaced approximately 12 μm apart, resulting in a void pitch of 24 μm. In that instance, the dimensions of probe elements 130 and 132 may be similar to that of voids 104, e.g., the distal end or tips of probe elements 130 and 132 may be 6 μm or less in diameter and spaced 12 μm center to center. As the size of the voids 104 is reduced, the size of the probe elements is reduced accordingly to maintain similar resolution and accuracy. The reduction in size further reduces the current and resulting servo signal output. FIG. 4 illustrates an exemplary pattern of voids 404 in one example that may be patterned onto a conductive material, e.g., longitudinally along a magnetic storage tape.

Probe elements 130 and 132 and supporting probe structure of sensor 150 may be fabricated using various techniques and material depending, for example, on the size of void 104 to be detected. For large voids, e.g., greater than 0.010 inch in diameter, simple mechanical molding processes can be used to position and hold proportionally sized probe elements in a plastic molded structure (or other generally non-conductive material). For voids less than 0.010 inch in diameter, photolithographic manufacturing techniques can be used to fabricate probe tips on suitable non-conductive material.

In one example, generally suitable for a magnetic tape drive system, probe elements 130 and 132 and the structure (e.g., shown in outline in FIG. 1) of sensor 150 are manufactured using conventional semiconductor techniques. The supporting structure may include $CaTiO_3$ or other suitable nonconductive ceramics to house and position probe elements 130 and 132. In this instance, probe elements 130 and 132 may be recessed from the surface of the nonconductive supporting structure, so as not to contact conductive material 102 directly during operation. The nonconductive supporting structure further positions conductive material 102 a fixed distance from probe elements 130 and 132 during use. Additionally, in one example, the supporting structure and probe elements 130 and 132 are included with a recording head of a magnetic storage media drive, e.g., on an island or outrigger of a recording head.

A magnetic storage tape drive system may include a drive servo system having a position sensor similar to position sensor 100 illustrated in FIG. 1. At least a portion of a magnetic recording tape, e.g., a conductive layer, within the tape drive serves as the conductive material having one or more voids formed therein. Conventional SDLT storage tape, for example, includes servo marks on the back-coating that are laser etched into the surface and commonly used in conjunction with an optical servo system. The laser-etched servo marks are depressions in the tape media back-coating and provide suitable voids for the servo system. An exemplary void sensor can detect the SDLT servo marks on the back coating as described above to provide position information to the drive servo system. The return path of the current is provided in the tape path, e.g., through a roller, guide, or the like that is in contact with the tape. Although the present example is described with respect to SDLT tape and drive system, it will be recognized that the general principles of the examples described herein may be applied to various other storage tapes, disks, and the like which include a conductive portion or layer.

In other examples, voids (e.g., servo marks), are disposed on the front coating surface of a magnetic tape, which may enable a tape drive system to include an electromagnetic sensor with the magnetic recording head assembly and be positioned over the voids. The front coating of a conventional SDLT tape media or other conductive recording media may be formatted with suitable voids and used with an exemplary electromagnetic void servo system. The head actuator mass may be reduced compared to typical actuators including optical servo systems and the like, such as conventionally employed in SDLT media drives, which may result in a higher bandwidth, smaller track pitch system.

In one example, a magnetic tape is formatted with a grid of voids 404 (servo marks) arranged in rows stretching longitudinally along the tape as shown in FIG. 4. Each row of voids may correspond to one track. Thus, for a conventional SDLT tape, 14 (out of 17) tracks are used for each data band of the storage tape. In one example, the grid includes a row of voids for each row of data tracks within the data band. In other examples, additional tracks can be used to provide margin for tape interchange where the variation of the probe tips to the magnetic head from drive to drive can be accommodated by using 16 or 18 void rows. A suitable calibration procedure may be employed to position the magnetic head over the written track, and to position the magnetic head within a predetermined tolerance of a given lateral location for writing.

Figure 3:
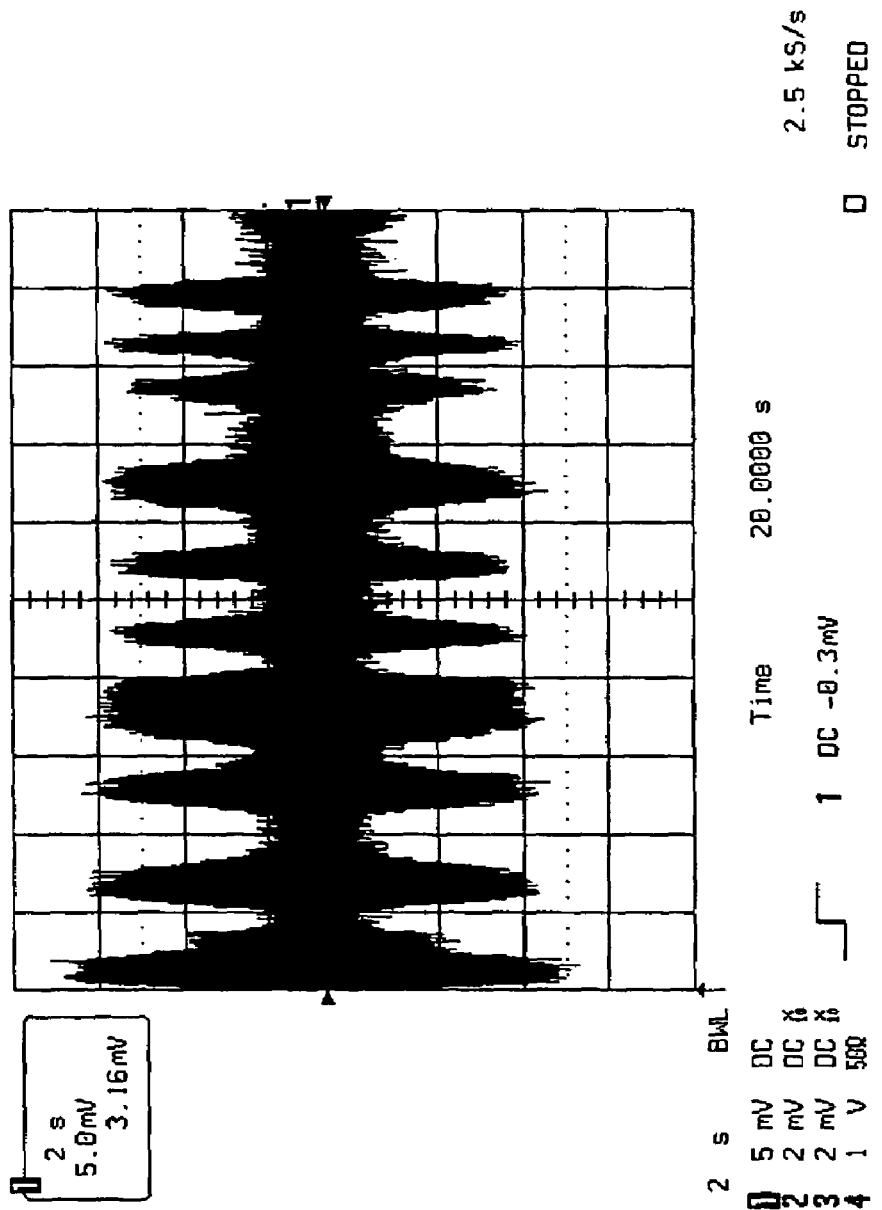
FIG. 3 illustrates an exemplary position sensor signal.

FIG. 3 illustrates an exemplary signal using a position sensor similar to that shown in FIG. 1. A sinusoidal signal is generated from the sensor as one probe element traverses a void and the other probe tip is over conductive material. FIG. 3 illustrates the steady state difference in potential when the probe tips are in free space, or located over the conductive material. In this example, the probe passed over 10 voids corresponding to each "pulse width." The envelope of the signal demonstrates the desired sensor response—as voids move under one probe element, the signal shows modulation pulses corresponding to the void position. The pulses illustrate the sinusoidal response of this system, demonstrating the s-curve that may be used in a servo positioning system.

As with typical optical servo systems, e.g., push-pull servo systems, an s-curve may be generated by the position sensor to determine position. Additionally, two s-curves may be used having a given phase difference, in one example, a 90 degree difference, to provide in-phase and quadrature or sine and cosine signals, providing both position and direction of relative motion. Two pairs of probe tips positioned 90-degrees apart may provide two such signals. Alternatively, those skilled in the art will recognize that the probes in each pair may be positioned partially orthogonally while still allowing the in-phase and quadrature components to be derived from the resulting measurement.

According to another aspect, a capacitive position sensor is provided that may be used, for example, in a servo system, to determine a relative position of a medium to the sensor based on capacitive measurements of two or more probe elements. A capacitive sensor may be employed to acquire position information of a conductive material including voids similar to the electromagnetic position sensor described above, but does not need an electrical return path. The position sensor may be used in various devices, including, but not limited to, disk drive servo systems, tape drive servo systems, optical recording servo systems, and micro positioning actuators. The capacitive probe possesses at least similar advantages as those described above with respect to the electrical probe when compared to conventional optical servo sensor systems.

The detector may include two or more probe elements, and in one example includes a grid of conductive plate pairs mounted perpendicularly to the conductive surface. During operation, probe elements, e.g., a capacitive probe grid array, is capacitively coupled to the conductive material such that as there is a change in conductivity or distance from the conductive material to the probe elements, the capacitance of the detector changes. In one example, the conductive material has been fabricated with a known pattern of voids. The capacitive probe detects the position of these voids by detecting a change of capacitance as the voids move beneath the probe elements. In one example, a capacitance bridge is used to detect very small capacitance changes. The change in capacitance is transformed, or calibrated, into a distance measurement by the positioning system and the signal may be used in a servo feedback system to maintain a desired position of the probe elements to the pattern of voids.

Figure 7A:
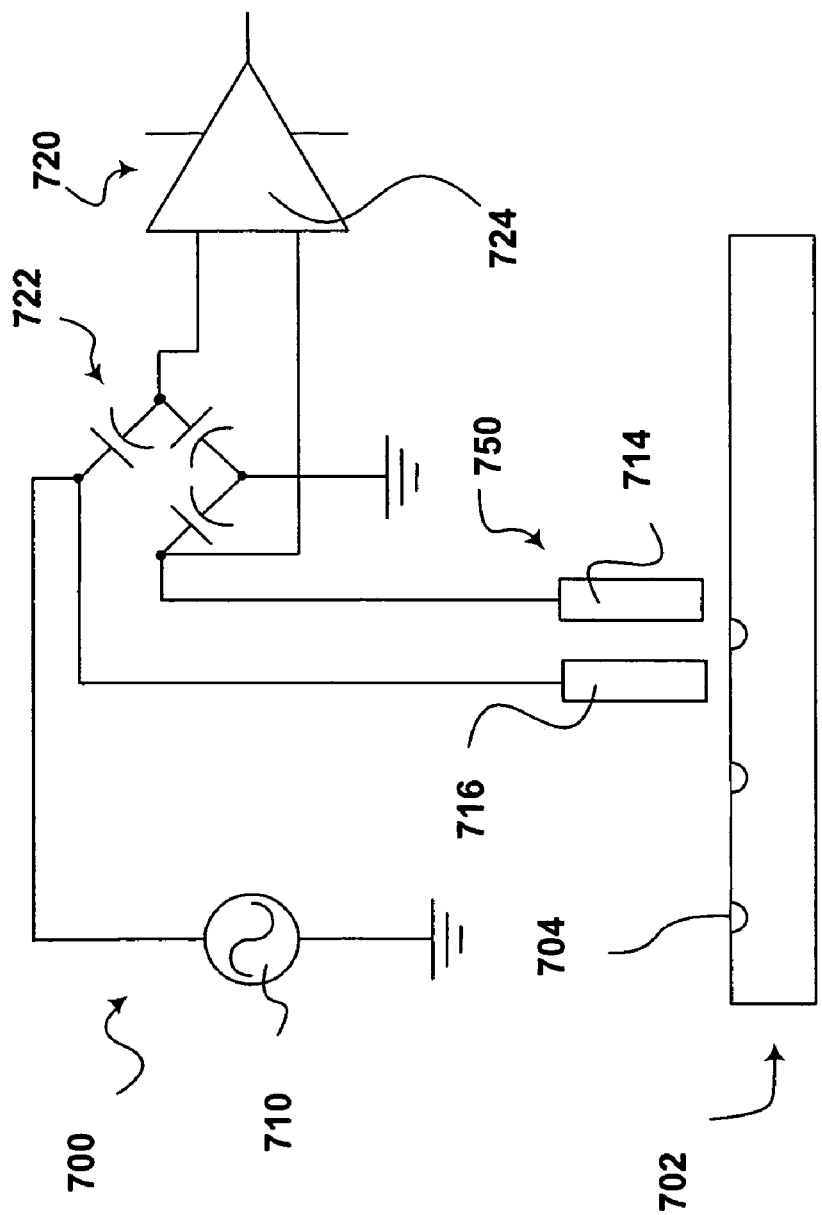
FIGS. 7A and 7B illustrate exemplary capacitive position sensor systems.

FIG. 7A illustrates an exemplary capacitance sensor positioning system 700. Capacitance sensor positioning system 700 is similar to the electromagnetic sensor of FIG. 1 in several aspects, but most notable, does not require a return path through the conductive material. In this instance, capacitance probe system 700 includes probe 750, comprising capacitance elements 712 and 714, frequency source 710, capacitance bridge 722, and capacitance bridge amplifier 724. Frequency source 710 provides a driving current to probe elements 712 and 714, e.g., between approximately 10 MHz to 2 GHz. The detector may include any suitable voltage measurement system. Further, in other examples, direct current may be used with an appropriate electronic system design.

The voltage from each micro-sensor capacitance plate 712 and 714 is connected to a capacitance bridge 722 that differentially detects voltage across capacitance elements 712 and 714. The capacitance bridge is monitored using the voltage detection system 720 and output as a signal associated with the capacitance across elements 712 and 714. The output signal may be passed on to an analog to digital converter ("ADC"), for input into a microprocessor, servo controller, or the like. The detection system 720 may include any suitable device to compare electrical characteristics associated with probe elements 712 and 714.

When capacitance sensor 700 crosses over or translates sufficiently near a void 704, a resulting change in capacitance across elements 712 and 714 may be detected. The relative position of the probe tip grid 50 to the void 704 can precisely be monitored and used as position information in a servo system. The measured voltage from capacitance bridge 720 may be converted into a measured distance associated with the position of void(s) 704 and probe sensor 750 using calibration algorithms known in the art.

The proximity of probe elements 712 and 714 to conductive material 702 is such that the voids can be detected. For example, a distance of approximately 0.001 to 0.005 inches for a void size and probe element size of approximately 0.00004 to 0.0012 inches. The position sensor generally functions by detecting capacitance changes of probe elements 712 and 714 (and in some examples a capacitance grid sensor) as they are influenced by conductive material 702 and voids 704. The capacitive coupling between probe elements 712 and 714 and conductive material 702 around voids 704 varies as a function of the distance between void 704 and probe elements 712 and 714. The additional use of capacitor bridge circuit 722 may increase the sensitivity to small variations in capacitance measurements.

When capacitance probe elements 712 and 714 are positioned in proximity of the target conductive material 702 including a pattern of voids 704, two capacitance circuits are realized. The first capacitance circuit is between a reference capacitance plate to conductive material 702, e.g., one of the probe elements over a surface of conductive material 702, and the second capacitance circuit is a return path through one or more probe elements adjacent one or more voids. The total capacitance is measured through a matching circuit bridge. The capacitance changes when the void pattern moves under the probe tip grid set (the variable capacitance is similar to the tuning circuit in a radio). The capacitance between the tips through the conductive material and back into the reference plate is measured by the capacitance bridge. The relative change in capacitance represents a measure of the position from the probe tips to the voids and may be precisely measured and monitored to provide accurate position information for high position sensitivity in a servo system.

Figure 7B:
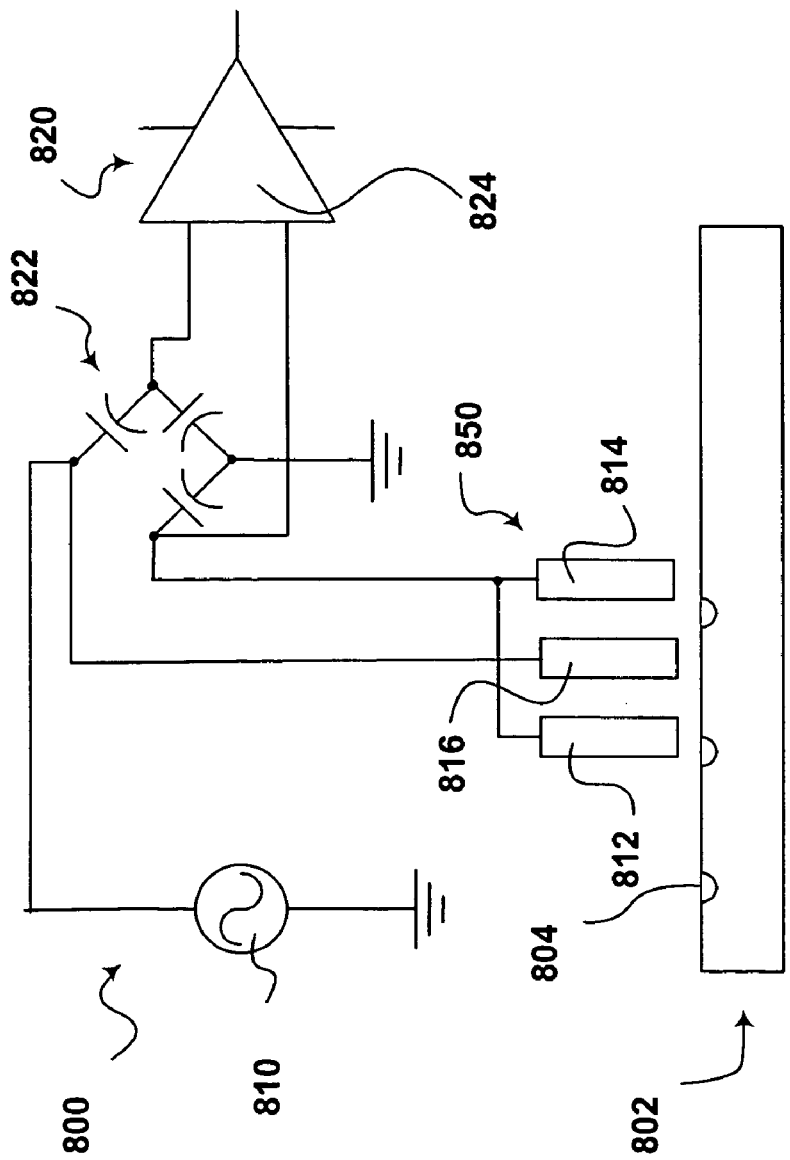

FIG. 7B illustrates another exemplary capacitive position sensor system 800. The exemplary system 800 is similar to system 800, except that system 800 includes three probe elements 812, 814, and 816, where probe elements 812 and 814 are coupled and positioned on opposite sides of probe elements 816.

Capacitive position sensor system 800 further includes probe 850, comprising capacitance elements 812, 814, and 816, frequency source 810, capacitance bridge 822, and detector 820 including a capacitance bridge amplifier 824. Similar to the example of FIG. 7A, capacitance probe system 800 outputs a signal associated with a difference of voltage or capacitance across probe elements 812, 814, and 816.

A capacitive probe sensor, including two or more probe elements, may include variously shaped and configured probe elements. In one example, a capacitance sensor includes an array of probe elements similar to the electrical position sensors described above. In one example, a capacitive probe in a position sensor employs flat conductive plates parallel to each other for each capacitor in the grid as shown in FIGS. 7A and 7B.

Figure 5:
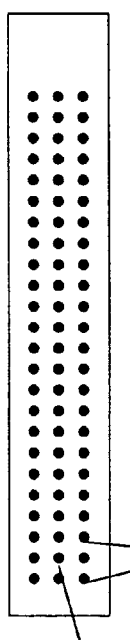
FIG. 5 illustrates an exemplary probe grid array and probe element configuration.
Figure 6:
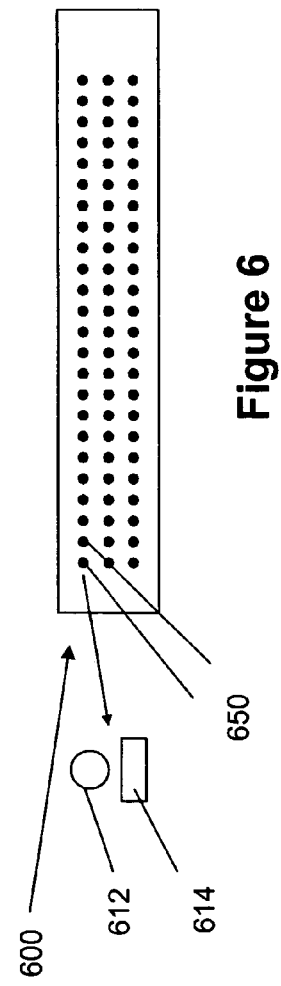
FIG. 6 illustrates an exemplary probe grid array and probe element configuration.

FIGS. 5 and 6 illustrate exemplary capacitor elements arranged in grids including multiple probes 550 and 650 respectively, and specific configurations of each probe 550 and 650 in the grid. FIG. 5 illustrates a grid of probe elements where each element of the grid includes a round cylinder conductor 512 and a center coaxial solid conductor 514. Additionally, FIG. 6 illustrates another grid of probe elements where each element of the grid includes a solid cylindrical conductor 612 and an adjacent flat plate 614. It will be recognized that various other configuration using two or more elements may correspond to each probe of the exemplary grid arrays.

In one example, the size of individual probe elements are selected to correspond to the relative size of the voids such that the probe elements will be sufficiently sensitive to the voids. Generally, as capacitance size decreases, the detected or measured capacitance variance increases. To improve the measured capacitance, the variance is decreased to increase the SNR. The SNR of a low capacitance micro-probe system can be improved by using higher driving frequencies, reducing the distance from the probe elements to the voids, by extending the probe into an x-y grid of capacitance microsensors, and the like. By using some or all of these methods, the variance of the capacitance will decrease, thereby increasing the detection sensitivity.

Similar to the electrical position sensor system, the probe tips of the capacitive sensor system may be fabricated using various techniques depending on the size of the void to be detected. For large voids, greater than 0.010 inch in diameter, simple mechanical molding processes can be used to position and hold two probe tips in a plastic molded structure. For voids less than 0.010 inch in diameter, photolithographic techniques or MEMs devices can be used to fabricate the probe on suitable non conductive material. In the case of a tape drive system, the probe tips can be manufactured using semi-conductor techniques, $CaTiO_3$, or a non conductive suitable ceramic to house the tips. The probe tips in this case can be recessed from the surface of the ceramic, so as not to contact the conductive material, using the ceramic to position the media at a fixed distance from the probe tips. In one example, the ceramic may include an island on a read/write head.

EXAMPLE

Experimental data was collected using a standard capacitance probe made by ADE Technologies, model 5300, with a standard conductive prototype circuit board containing predrilled holes, i.e., voids. The conductive hole diameter was 0.082 inches and the spacing of the holes from center to center was 0.100 inches. The capacitance probe was aligned over the holes and the board was manually moved under the sensor, which included a single coaxial capacitive probe tip. The change in capacitance measured by the probe corresponded to the hole diameter and the hole spacing. Generally, an ADE capacitance probe is used to measure distance from the probe tip to the conductive material. For example, the conductive material might include a metal shaft, disk from a disk drive, or other rotating object whose runout is to be detected. In this case it is not the distance from the probe tip to the conductive material that is measured, but the lateral position of the probe tip with respect to the holes.

Figure 8:
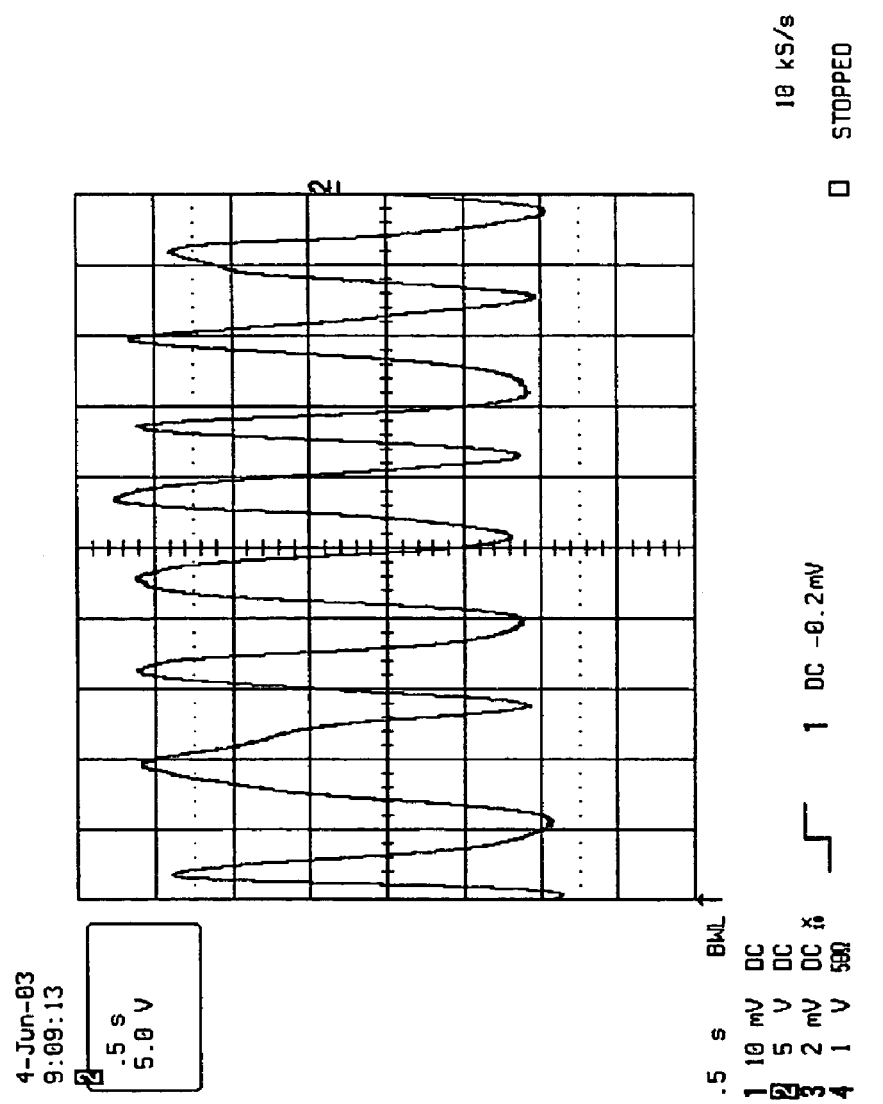
FIG. 8 illustrates an exemplary signal from a capacitive servo system.

FIG. 8 illustrates the capacitance probe measurement when the prototype circuit board is moved beneath the ADE capacitance probe manually. The capacitance probe was moved off of the center of the holes to observe a waveform that would not saturate the instrument. Because of this offset the waveform is asymmetric, exhibiting sharper peaks and wider troughs. This waveform clearly shows the periodic nature of the holes (e.g., void motion) when they are in motion under the capacitance probe.

According to another aspect, exemplary magnetic recording heads and servo systems are described having electromagnetic and/or capacitive probes. In a conventional tape drive, such as the SDLT tape drive manufactured by Quantum Corporation, the optical servo system requires a number of precision optical and mechanical components with attendant precision mechanical and optical alignments. In one exemplary servo system described herein, the number of components may be reduced by using islands (or bumps) of the magnetic head structure to house electromagnetic or capacitance position sensors that detect lateral position of the head relative to the magnetic tape.

Compared with conventional optical servo systems, e.g., an SDLT servo system, exemplary systems including electromagnetic and/or capacitive sensors may be employed without additional optical components resulting in a lower mass head assembly. For example, a focalizer and focalizer arm may be eliminated, resulting in a lower moment of inertia and mass of the head assembly. A reduction in the mass and moment of inertia enables the actuator to have a greater response time and increased bandwidth. The actuator may therefore follow larger excursions possessing higher frequencies of LTM, and to have the additional characteristic of a lower position error signal. In addition, the system enables servoing at a smaller track pitch and higher tape velocities.

In one exemplary servo system for magnetic media, the position sensors of the invention can be implemented in separate islands next to the magnetic head, or as additional structures on the same substrate as the magnetic recording head. Each structure, in this implementation, may be constructed using conventional photolithographic techniques, and can be constructed using conventional techniques to produce data transducer(s). The sensors can be used to detect voids on the front, magnetic data side, as well as the back, generally non-magnetic side, of tape media. The following describes various configurations of electromagnetic and/or capacitive sensors adapted to detect voids associated with a magnetic recording tape. In other storage systems, e.g., magnetic or optical disks, similar designs are contemplated.

Figure 9:
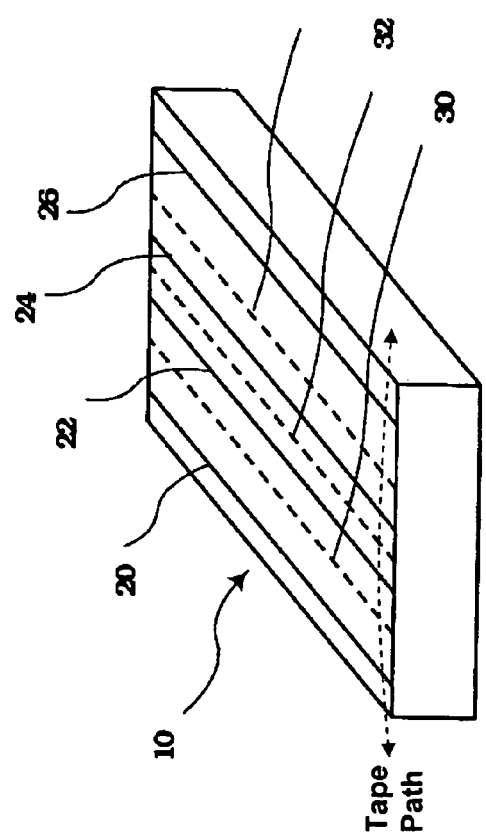
FIG. 9 illustrates an exemplary head structure for a capacitive and/or electrical position sensor system and data transducer elements.

FIG. 9 illustrates an exemplary configuration of a typical magnetic recording head 10 used in a magnetic tape drive. Raised portions of the head that contact the tape media are generally referred to as islands (or bumps). In this example, head 10 includes two islands with no active elements on them, generally referred to as outriggers 20 and 26, that may be designed and used, for example, for the removal of small dry contaminates, to create a desired wrap angle of tape with head 10, and the like. Islands 22 and 24 (sometimes referred to as "active islands") include a plurality of recording and/or reading elements and are used for magnetic data recording and reading. For simplicity, the examples herein illustrate a single channel head that writes and records magnetic data, but it will be understood that the description applies equally to multi-channel heads as well as read only or write only heads.

Additionally, head 10 includes islands 30, 32, and 34 adjacent islands 22 and 24. Islands 30, 32, and 34 may include one or more of an electromagnetic sensor and/or a capacitive sensor. In one example, multiple sensors are included on different islands 30, 32, and 34 to provide offset sensors and resulting quadrature position signals.

With continued reference to FIG. 9, FIG. 10 illustrates an exemplary head configuration 40 of two probes 52 and 54 and two sets of read/write elements 55, 56, and 58, 59 located on active islands 22 and 24 respectively. Probes 52 and 54 may include electromagnetic or capacitive probes as previously descried. In this example, probes 52 and 54 are individual pairs of probe elements; however, it is understood that probes 52 and 54 may include a one or two dimensional array of probe elements. Forward writing element 55 is followed by forward read element 58, and backward writing element 59 is followed by backward read element 56. For illustrative and reference purposes a track centerline 60 is also illustrated.

In the exemplary head configuration 40, probes 52 and 54 are both located on island 30 (shown in FIG. 9), ahead of forward writing element 55. The sensor system comprises two probes 52 and 54 positioned 90 degrees laterally apart from each other to produce sine and cosine waveforms as probes 52 and 54 move over and detect voids. The two waveforms may be used in a push-pull servo signal configuration to appropriately adjust the position of head 10 if offset from a reference position. As will be recognized by those of ordinary skill in the art, proper electrical signal conditioning results in a signal calibrated, conditioned, and matched to an actuator for use in a precision servo control system. Additionally, head configuration 50 may include an electromagnetic shield or capacitance shield 53 to isolate electromagnetic or capacitive probes.

FIG. 11 illustrates another exemplary head configuration 70. In this example, probes 52 and 54 are positioned on two separate islands 32 and 34 (see FIG. 9), each laterally spaced 90 degrees.

FIG. 12 illustrates another exemplary head configuration 90. In this example, probes 52 and 54 are positioned on island 32 disposed between read/write elements 55, 56, and 58, 59, and laterally displaced 90 degrees. Additionally, in this example, an electromagnetic shield or capacitance shield 53 is included.

Those of ordinary skill in the art will recognize that exemplary read/write head configuration including electromagnetic and/or capacitive void sensing probes may include numerous other configurations. For example, probes 52 and 54 could be included on an active island 22 or 24. In other examples, probes can be housed on a separate head and placed longitudinally or laterally adjacent a read/write head on the same side of a storage tape.

Alternatively, electromagnetic or capacitive probes may be disposed on a backside or side opposite the recording side of a storage tape, which side a read/write head would be disposed. For example, the sensor can be used to detect voids on the generally non-magnetic back side of the tape media. For instance, electromagnetic or capacitive probe sensors may be included in a supporting structure attached to the head actuator. The supporting structure houses the probes in an unobstructed means while the tape is being loaded and unloaded from the tape drive, and allows the tape to contact the magnetic recording heads without obstruction.

Figure 13:
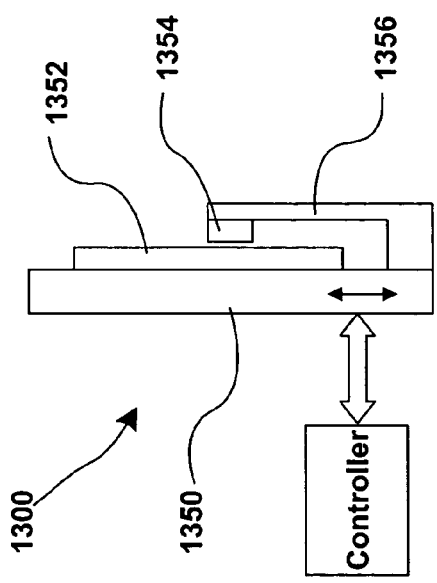
FIGS. 13 and 14 illustrate an exemplary support structure for a recording head having a capacitive and/or electrical servo system in a media drive system.

FIG. 13 illustrates a side-view of an exemplary configuration of head assembly 1300. Head assembly 1300 includes a position sensor 1354 and may move within a drive to allow unobstructed tape loading, unloading, and desired contact of head 1352 with tape (not shown), which during operation would pass between head 1352 and position sensor 1354. In one example, when tape is being loaded or unloaded, the supporting structure 1300 will be in a down position, out of the tape path, thereby allowing the tape buckle to clear structure 1300 and allow tape to be lifted from the magnetic recording head when a shutter is employed, as in a conventional SDLT tape drive. Elements of position sensor 1354 may be recessed from the tape supporting structure as previously described. FIG. 13 shows a side view of the supporting structure 1300 for the magnetic-recording head 1352, its support 1350, the micro-void sensor 1354, and the micro-void sensor support 1356.

Figure 14:
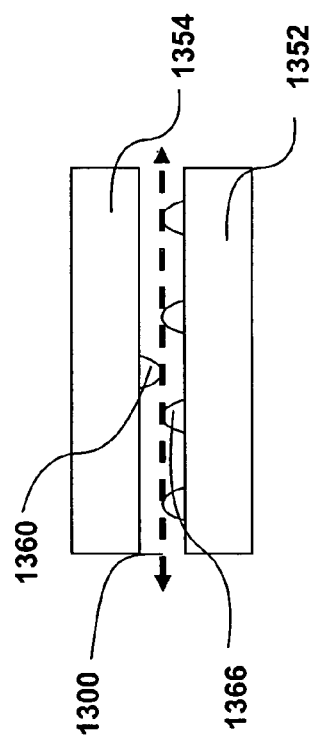

FIG. 14 illustrates a top view of support structure 1300 and a magnetic storage tape 1300 (shown in dotted line) disposed between head 1352 and position sensor 1354. Head 1352 includes islands 1366, which may include read/write elements. Additionally, position sensor 1354 includes a void sensor 1360, e.g., an electromagnetic or capacitive sensor.

In other examples, where a position sensor is included on a similar side as read/write elements, a head assembly similar to FIGS. 13 and 14, may be used except that support arm 1356 may be unnecessary. For example, the position sensor may be included on an island 1366 of head 1352 as described with reference to FIG. 9.

The above detailed description is provided to illustrate exemplary embodiments and is not intended to be limiting. It will be apparent to those of ordinary skill in the art that numerous modification and variations within the scope of the present invention are possible. For example, various exemplary methods and systems described herein may be used alone or in combination with various other positional and/or servo methods and systems whether described herein or otherwise, including, e.g., optical or magnetic servo methods and systems. Additionally, particular examples have been discussed and how these examples are thought to address certain disadvantages in related art. This discussion is not meant, however, to restrict the various examples to methods and/or systems that actually address or solve the disadvantages.

The invention claimed is:

1. A system for sensing a position of a conductive material having at least one void formed therein, comprising:
    a sensor having a two-dimensional array of probe elements, wherein the sensor generates a signal in response to an electrical measurement across at least two of the probe elements that varies in response to an interaction of the at least two probe elements with the at least one void.

2. The system of claim 1, further including a transducer head having at least one magnetic read element.

3. The system of claim 2, wherein the position sensor and the transducer head are positioned adjacent each other on one side of an expected position of the conductive material.

4. The system of claim 2, wherein the position sensor and the transducer head are positioned opposing each other on opposite sides of an expected position of the conductive material.

5. The system of claim 2, further including a controller configured to adjust the position of the transducer head relative to the conductive material in response to one or more signals from the position sensor.

6. The system of claim 2, wherein the transducer head includes a read/write head having at least one active island.

7. The system of claim 1, wherein the probe elements include tips.

8. The system of claim 7, wherein the tips have a diameter of approximately 6 µm and are spaced at a pitch of approximately 12 µm.

9. The system of claim 1, wherein the at probe elements include plates.

10. The system of claim 1, wherein the signal is associated with a difference in current through at least a portion of the probe elements.

11. The system of claim 1, wherein the signal is associated with a difference in potential of at least a portion of the probe elements.

12. The system of claim 1, wherein the signal is associated with a change in capacitance of at least a portion of the probe elements.

13. The system of claim 1, further including a second position sensor having at least two probe elements.

14. The system of claim 13, wherein the position sensor and second position sensor are positioned at least partially offset with respect to each other along a direction of motion of the conductive material to produce at least partially orthogonal signals associated with the relative position of the conductive material with respect to the position sensor and the second position sensor.

15. The system of claim 1, wherein the at least two probe elements are driven by a frequency source in the range of 10 MHz to 2 GHz.

16. A servo system for positioning a transducer head relative to a magnetic storage tape having at least one void formed therein, comprising:
    a head assembly including a data transducer;
    a sensor having a two dimensional array of probe elements, wherein the sensor gene rates a signal in response to an electrical measurement across the probe elements that varies in response to an interaction of at least two of the probe elements with the at least one void formed in a magnetic storage medium; and
    a controller for adjusting the data transducer relative to the magnetic storage medium in response to the signal.

17. The system of claim 16, wherein the probe elements include tips.

18. The system of claim 17, wherein the tips have a diameter of approximately 6 µm and are spaced at a pitch of approximately 12 µm.

19. The system of claim 16, wherein the probe elements include plates.

20. The system of claim 16, wherein the signal is associated with a difference in current through at least a portion of the probe elements.

21. The system of claim 16, wherein the signal is associated with a difference in potential of at least a portion of the probe elements.

22. The system of claim 16, wherein the signal is associated with a change in capacitance of at least a portion of the probe elements.

23. The system of claim 16, further including a second position sensor having at least two probe elements.

24. The system of claim 23, wherein the position sensor and second position sensor are positioned at least partially offset with respect to each other along a direction of motion of the conductive material to produce at least partially orthogonal signals associated with the relative position of the conductive material with respect to the position sensor and the second position sensor.

25. The system of claim 16, wherein the at least two probe elements are driven by a frequency source in the range of 10 MHz to 2 GHz.

26. A method for sensing the position of a conductive material having at least one void formed therein, the method comprising:

generating a signal associated with a measure across a two-dimensional array of probe elements positioned adjacent a conductive material having at least one void formed therein, wherein the signal is associated with the interaction of at least two of the probe elements with the conductive material and the at least one void;

determining a relative position of the conductive material with respect to the probe elements in response to the signal.

27. The method of claim 26, wherein the conductive material includes a layer of a magnetic storage medium.

28. The method of claim 26, wherein the voids are patterned longitudinally along the magnetic storage medium.

29. The method of claim 26, wherein the probe is coupled to a recording head of a media drive.

30. The method of claim 26, wherein the at least one void includes circular shaped depressions on the surface of the conductive material.

31. The method of claim 26, wherein multiple voids are disposed on the surface of the conductive material with a pitch of approximately 24 µm and a diameter of 12 µm.

32. The method of claim 26, wherein the at least one void includes a stripe on the surface of the conductive material.

33. The method of claim 26, wherein the signal is associated with a difference in current through at least a portion of the probe elements.

34. The method of claim 26, wherein the signal is associated with a difference in potential across at least a portion of the probe elements.

35. The method of claim 26, wherein the signal is associated with a change in capacitance of at least a portion of the probe elements.

36. The method of claim 26, wherein the probe elements include a first probe including at least two probe elements and a second probe including at least two probe elements.

37. The method of claim 36, wherein the first probe and the second probe are positioned at least partially offset with respect to each other along a direction of motion of the conductive material to produce at least partially orthogonal signals associated with the relative position of the first probe and the second probe and the conductive material.

38. The method of claim 26, wherein the at least two probes are driven by a frequency source in the range of 10 MHz to 2 GHz.

39. A method for positioning a transducer head relative to a magnetic storage tape having at least one void formed therein, the method comprising:

generating a signal associated with a measure across at least two probe elements of a two dimensional array of probe elements positioned adjacent a magnetic storage tape having at least one void formed therein, wherein the signal is associated with the interaction of the at least two probe elements with the magnetic storage tape and the at least one void; and positioning a transducer head relative to the magnetic storage tape in response to the signal.

40. The method of claim 39, wherein the at least one void form a servo track longitudinally along the magnetic storage tape.

41. The method of claim 39, wherein the at least one void are disposed longitudinally along the magnetic storage tape at a pitch of approximately 24 µm and a diameter of approximately 12 µm.

42. The method of claim 39, wherein the signal is associated with a difference in current through at least a portion of the probe elements.

43. The method of claim 39, wherein the signal is associated with a difference in potential across at least a portion of the probe elements.

44. The method of claim 39, wherein the signal is associated with a change in capacitance of at least a portion of the probe elements.

45. The method of claim 39, wherein the probe elements include a first probe including at least two probe elements and a second probe including at least two probe elements.

46. The method of claim 45, wherein the first probe and the second probe are positioned at least partially offset with respect to each other along a direction of motion of the conductive material to produce at least partially orthogonal signals associated with the relative position of the first probe and the second probe and the conductive material.

* * * * *